US010896432B1

(12) United States Patent
Bhaktwatsalam et al.

(10) Patent No.: US 10,896,432 B1
(45) Date of Patent: Jan. 19, 2021

(54) BANDWIDTH COST ASSIGNMENT FOR MULTI-TENANT NETWORKS

(71) Applicant: Amazon Technologies, Inc., Reno, NV (US)

(72) Inventors: Abhoy Bhaktwatsalam, Bothell, WA (US); Nathan Gavin Spitler, Seattle, WA (US); Rachit Chawla, Kirkland, WA (US); Louis Phu Dang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 523 days.

(21) Appl. No.: 14/492,796

(22) Filed: Sep. 22, 2014

(51) Int. Cl.
  *G06Q 10/00* (2012.01)
  *G06Q 30/02* (2012.01)
  *H04L 29/06* (2006.01)
  *H04L 12/26* (2006.01)

(52) U.S. Cl.
  CPC ......... *G06Q 30/0206* (2013.01); *H04L 43/08* (2013.01); *H04L 67/42* (2013.01)

(58) Field of Classification Search
  CPC .................................................. G06Q 30/0206
  See application file for complete search history.

(56) References Cited

U.S. PATENT DOCUMENTS

| | | | | | |
|---|---|---|---|---|---|
| 5,343,465 | A | * | 8/1994 | Khalil | H04L 43/00 370/232 |
| 5,583,857 | A | * | 12/1996 | Soumiya | H04L 12/5602 370/233 |
| 5,884,037 | A | * | 3/1999 | Aras | H04L 47/741 709/226 |
| 6,047,327 | A | * | 4/2000 | Tso | G06F 17/3087 707/E17.116 |
| 7,509,229 | B1 | * | 3/2009 | Wen | H04L 41/16 370/229 |

(Continued)

FOREIGN PATENT DOCUMENTS

| | | | | |
|---|---|---|---|---|
| EP | 2535855 | A1 * | 12/2012 | ......... H04L 67/1097 |
| WO | WO-2013192059 | A2 * | 12/2013 | ............. G06Q 30/08 |

OTHER PUBLICATIONS

Jeffrey K., MacKie-Mason, and Hal R. Varian (Pricing Congestible Network Resources, IEEE Journal on Selected Areas in Communications, vol. 13, No. 7, Sep. 1995). (Year: 1995).*

(Continued)

*Primary Examiner* — Hafiz A Kassim
(74) *Attorney, Agent, or Firm* — Davis Wright Tremaine LLP

(57) ABSTRACT

A network metering service obtains from a data store raw metering data specifying network bandwidth utilization for a plurality of customers. The network metering service aggregates this data in order to identify bandwidth usage for each service of a computing resource service provider and for each customer. Based on this data, the network metering service determines a peak-to-average score and a correlation coefficient for each customer, which may be used to determine a unit cost burden. The network metering service may utilize the unit cost burden for each customer to determine whether the customer should be provided with a discounted rate for network bandwidth usage or should incur a price increase.

21 Claims, 9 Drawing Sheets

(56) References Cited

U.S. PATENT DOCUMENTS

| | | | | |
|---|---|---|---|---|
| 7,761,548 | B2* | 7/2010 | Snyder | H04L 41/145 709/223 |
| 8,335,703 | B1* | 12/2012 | Pulier | H04L 47/822 705/7.11 |
| 8,656,005 | B2* | 2/2014 | Bozionek | H04L 29/06 709/224 |
| 8,667,056 | B1* | 3/2014 | Proulx | H04L 47/808 709/203 |
| 8,782,211 | B1* | 7/2014 | Sharma | H04L 67/325 709/224 |
| 8,787,873 | B1* | 7/2014 | Hitt | H04W 8/20 455/406 |
| 8,813,143 | B2* | 8/2014 | Hasek | H04N 7/17336 725/96 |
| 10,133,730 | B2* | 11/2018 | Galvin, Jr. | G06F 17/241 |
| 2003/0028642 | A1* | 2/2003 | Agarwal | G06F 9/505 709/226 |
| 2003/0074486 | A1* | 4/2003 | Anastasiadis | H04L 67/1097 719/321 |
| 2003/0204759 | A1* | 10/2003 | Singh | G06F 1/3203 713/320 |
| 2004/0138858 | A1* | 7/2004 | Carley | H04L 41/142 702/186 |
| 2005/0025164 | A1* | 2/2005 | Kavanagh | H04W 36/0033 370/401 |
| 2006/0242154 | A1* | 10/2006 | Rawat | G06F 17/30126 |
| 2007/0094375 | A1* | 4/2007 | Snyder | H04L 41/145 709/223 |
| 2008/0005695 | A1* | 1/2008 | Ozzie | G06F 17/30867 715/811 |
| 2009/0100459 | A1* | 4/2009 | Riedl | H04N 21/2385 725/35 |
| 2009/0157870 | A1* | 6/2009 | Nakadai | H04L 41/12 709/224 |
| 2009/0245107 | A1* | 10/2009 | Krishnaswamy | H04L 41/142 370/232 |
| 2009/0276771 | A1* | 11/2009 | Nickolov | G06F 9/4856 717/177 |
| 2009/0300173 | A1* | 12/2009 | Bakman | G06F 11/008 709/224 |
| 2010/0088410 | A1* | 4/2010 | Ridley | H04L 41/0896 709/224 |
| 2010/0146038 | A1* | 6/2010 | Hajiaghayi | H04L 67/288 709/203 |
| 2010/0205292 | A1* | 8/2010 | Diaz | H04L 12/40013 709/224 |
| 2011/0231551 | A1* | 9/2011 | Hassan | H04L 12/1421 709/226 |
| 2012/0071174 | A1* | 3/2012 | Bao | H04W 48/16 455/456.3 |
| 2012/0131194 | A1* | 5/2012 | Morgan | G06F 9/5072 709/226 |
| 2012/0226808 | A1* | 9/2012 | Morgan | G06F 9/5072 709/226 |
| 2013/0198050 | A1* | 8/2013 | Shroff | H04L 41/5009 705/34 |
| 2013/0254778 | A1* | 9/2013 | Lakshmanan | G06F 9/5088 718/105 |
| 2013/0262189 | A1* | 10/2013 | Anderson | H04L 41/145 705/7.36 |
| 2014/0012992 | A1* | 1/2014 | Koka | H04L 47/70 709/226 |
| 2014/0052847 | A1* | 2/2014 | Jadallah | H04L 43/0876 709/224 |
| 2014/0082614 | A1* | 3/2014 | Klein | G06F 9/45558 718/1 |
| 2014/0278807 | A1* | 9/2014 | Bohacek | G06Q 30/0206 705/7.35 |
| 2014/0280927 | A1* | 9/2014 | Ferris | H04L 67/1002 709/224 |
| 2014/0317166 | A1* | 10/2014 | Iyoob | G06Q 30/0631 709/201 |
| 2014/0351613 | A1* | 11/2014 | Kansal | G06F 1/3203 713/320 |
| 2014/0379102 | A1* | 12/2014 | Tian | G05B 11/01 700/52 |
| 2017/0230306 | A1* | 8/2017 | Cropper | H04L 67/1012 |

OTHER PUBLICATIONS

Mohammad Hajjat, Shankaranarayanan P N, David Maltz, Sanjay Rao, and Kunwadee Sripanidkulchai (,Dynamic Request Splitting for Interactive Cloud Applications, IEEE Journal on Selected Areas in Communications, vol. 31, No. 12, Dec. 2013). (Year: 2013).*

Jeffrey K. MacKie-Mason Hal R. Varian (Pricing the Internet, University of Michigan, Apr. 1993, Current version: Feb. 10, 1994) . (Year: 1994).*

Sangtae Ha, Soumya Sen, Carlee Joe-Wong, Youngbin Im, and Mung Chiang (TUBE: Time-Dependent Pricing for Mobile Data, SIGCOMM'12, Aug. 13-17, 2012, Helsinki, Finland). (Year: 2012).*

Joe Weinman (Smooth Operator: The Value of Demand Aggregation, Working Paper, Feb. 27, 2011). (Year: 2011).*

Di Niu (Demand Forecast, Resource Allocation and Pricing for Multimedia Delivery from the Cloud, Doctor of Philosophy Thesis, Edward S. Rogers Sr. Dept. of Electrical and Computer Engineering, University of Toronto, May 6, 2013). (Year: 2013).*

Insung Hong, Jisung Byun, and Sehyun Park (Cloud Computing-based Building Energy Management System with ZigBee Sensor Network, 2012 Sixth International Conference on Innovative Mobile and Internet Services in Ubiquitous Computing). (Year: 2012).*

Eugenio Alessandria, Massimo Gallo, Emilio Leonardi, Marco Mellia, Michela Meo Politecnico di Torino (P2P-TV Systems under Adverse Network Conditions: a Measurement Study, IEEE Communications Society subject matter experts for publication in the IEEE INFOCOM 2009 proceedings). (Year: 2009).*

* cited by examiner

US 10,896,432 B1

BANDWIDTH COST ASSIGNMENT FOR MULTI-TENANT NETWORKS

BACKGROUND

Computing resource service providers and other service providers often enable users to utilize multi-tenant networks to access a variety of computing resources provided by these service providers. However, there may be significant variance in the use of these multi-tenant networks. For instance, at certain times, the collective usage of the multi-tenant networks may exceed the collective average usage. In order to address this, service providers often will procure additional capacity that may be necessary to provide sufficient bandwidth. However, this has certain disadvantages. When the collective usage of these networks is at, under or, in some instances, over the collective average usage, this additional capacity may be underutilized, resulting in inefficiencies in these networks.

BRIEF DESCRIPTION OF THE DRAWINGS

Various embodiments in accordance with the present disclosure will be described with reference to the drawings, in which.

DETAILED DESCRIPTION

Figure 1:
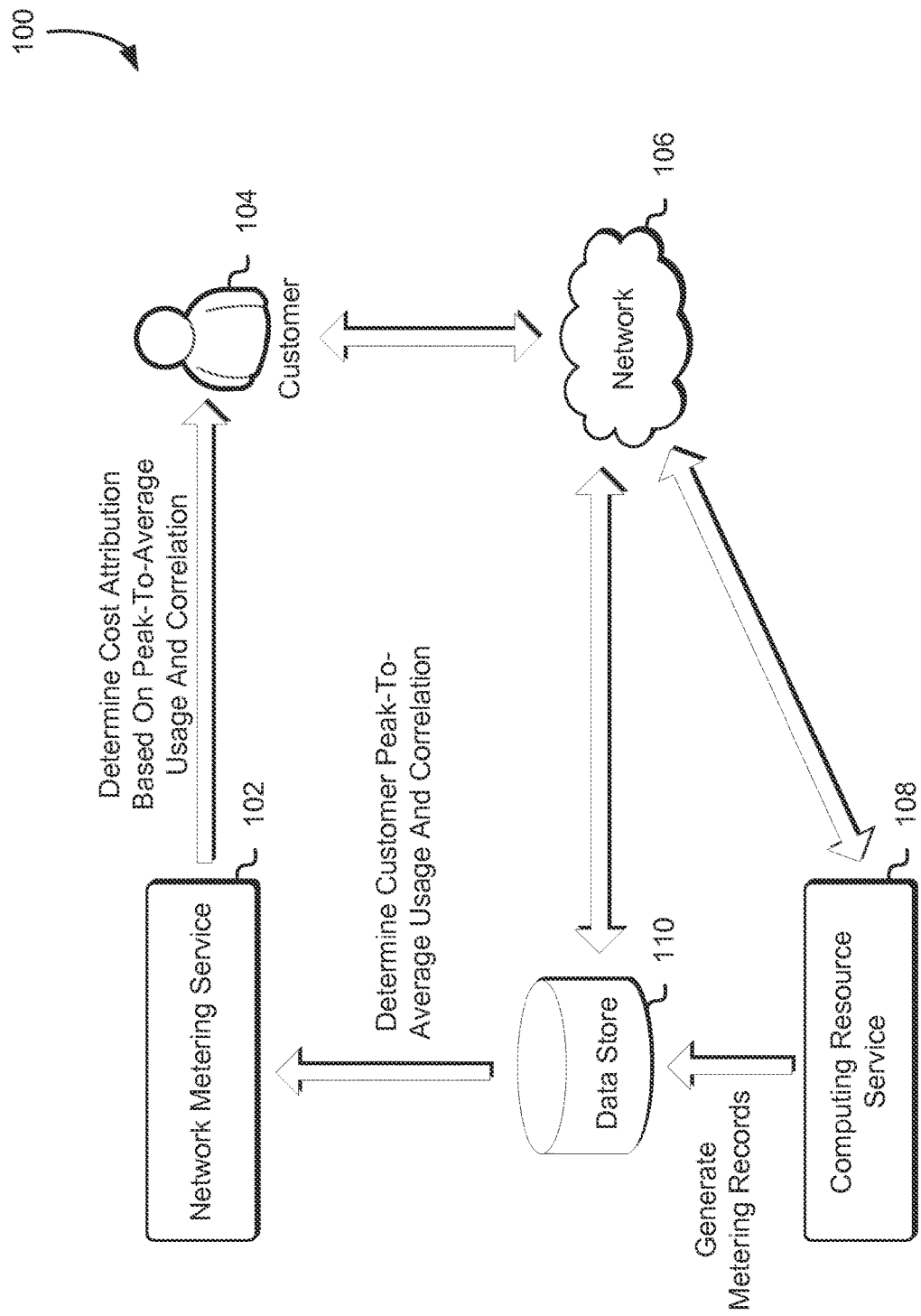
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to assigning a bandwidth cost to each user of a multi-tenant network based on a peak-to-average (P2A) utilization of the network bandwidth and a correlation between each user's usage and the total peak utilization of the network. In an embodiment, a network metering service, operated and managed by a computing resource service provider, is configured to obtain aggregate network usage data from a data storage service (e.g., object-based data storage service, block-based data storage service, etc.) to determine the total network bandwidth cost incurred by all entities (e.g., organizations) that utilize the multi-tenant network. Additionally, the network metering service may obtain, for each entity, the total network bandwidth usage for the entity. The entities may be customers of the computing resource service provider that operate various services such as a virtual computer system service, object-based data storage services, database services, the aforementioned channel management service and other services.

When the network metering service obtains the aggregate network usage data and determines the total network bandwidth cost incurred by all entities, the network metering service may calculate the P2A for each entity that has utilized the multi-tenant network. For instance, the network metering service may access a customer usage data repository and select a first entity from the repository to determine the entity's network bandwidth usage. Once the network metering service has selected an entity, the network metering service may compare the peak network bandwidth usage for the entity to the average peak utilization for all entities that have utilized the multi-tenant network over a particular period of time. The network metering service may calculate the P2A for this particular entity by obtaining the ratio of the peak network bandwidth usage for the entity to the average peak utilization. Thus, if the peak network bandwidth usage for the entity exceeds the average peak utilization, the P2A for the entity may be greater than one.

Once the network metering service has calculated the P2A for the entity, the network metering service may next calculate a correlation coefficient for the relationship between the network bandwidth usage of the entity and the total network usage by all entities. A positive correlation coefficient may denote that the entity's network usage is in greater sync to the total network usage (e.g., peak network usage by the entity closely matches peaks in network usage for the entire network). Alternatively, a negative correlation coefficient may denote that the entity's network usage is asynchronous with the network usage trends for the entire network (e.g., greater network usage during off-hours, etc.). A correlation coefficient that is close to zero may denote that the entity's network usage is random and thus there is no correlation.

In an embodiment, the network metering service may utilize the calculated P2A and correlation coefficient for the selected entity to calculate a cost burden score for the entity. If the network metering service determines, based on the calculation, that the entity has a negative cost burden score, then the network metering service may specify that the entity may be given a discounted price for utilizing the network bandwidth. Alternatively, if the network metering service determines, based on the calculation that the entity has a positive cost burden score, then network metering service may specify that the entity should bear a greater cost burden (e.g., pay more) in utilizing the network bandwidth. The network metering service may utilize a calculation that is derived to satisfy one or more constraints. For instance, a constraint that may be applied is that the sum of the burden and discounts calculated should be equal to zero.

In this manner, a computing resource service provider or other service provider can determine the cost burden for each entity and, based on the cost burden, assign a bandwidth cost for each entity. In addition, the techniques described and suggested herein facilitate additional technical advantages. For example, because, in some embodiments, the computing resource service provider may utilize the network metering service to identify one or more entities that have a greater cost burden score, the computing resource service provider may reach out to these entities and encourage reduced network bandwidth usage at peak times. This, in turn, may improve the efficiency of the network and obviate the need for additional hardware components, as entities adapt based on the recommendations from the computing resource service provider.

FIG. 1 shows an illustrative example of an environment 100 in which various embodiments can be implemented. In the environment 100, a network metering service 102 may be configured to obtain, from a data store 110, one or more metering records in order to determine a bandwidth cost assignment for one or more customers 104 of the computing resource service provider. The metering data may include raw network bandwidth usage data for all customer 104 interactions with the one or more computing resource services 108 provided by the computing resource service provider. For instance, each computing resource service 108 may be configured to record metering data over a particular period of time and store the metering data within the data store 110 for further analysis by the network metering service 102. Thus, as a customer 104 utilizes the computing resource service 108 through one or more communications networks 106, such as the Internet, the computing resource service 108 may record the amount of network bandwidth that the customer 104 is utilizing, as well as the total network bandwidth usage for all customers of the computing resource service provider. Additionally, the computing resource service 108 may record metering data across various other services provided by the computing resource service provider.

When the network metering service 102 obtains the one or more metering records from the data store 110, the network metering service 102 may determine one or more metrics associated with each customer's bandwidth usage. These one or metrics may include a P2A score and a correlation coefficient for each customer 104 of the computing resource service provider. For instance, in an embodiment, the network metering service 102 obtains the raw metering data from the data store 110 and utilizes a map reduce process to aggregate this metering data at a certain level of granularity (e.g., five minute intervals, fifteen minute intervals, etc.). Further, the network metering service 102 may be configured to categorize the metering data based at least in part on the network bandwidth flow among the computing resource services 108 provided by the computing resource service provider. For instance, the network metering service 102 may categorize the metering data based at least in part on the flow of data through the network 106 (e.g., from the customer 104 to the computing resource service 108, from the computing resource service 108 to the customer 104, from a computing resource service 108 to another service, etc.). In an embodiment, the customer 104 provides proposed bandwidth usage information to the network metering service 102 or other computing resource service 108. The network metering service 102 may utilize this proposed bandwidth usage information to estimate a P2A score and a correlation coefficient for this particular customer 104 and, as will be described in greater detail below, the customer's 104 unit cost burden. This may enable the network metering service 102 to determine the cost attribution for the customer 104.

Once the network metering service 102 has aggregated and categorized the received metrics data, the network metering service 102 may calculate the total network bandwidth cost and the total network bandwidth usage for the computing resource service provider network. For instance, in an embodiment, the network metering service 102 calculates a blended unit cost of bandwidth for the computing resource service provider network. In order to determine the blended unit cost of bandwidth, the network metering service 102 may first calculate the total bandwidth cost for all data flows (e.g., network bandwidth utilization) from customers of the computing resource service provider and the one or more computing resource services 108 provided by the computing resource service provider through the communications network 106. Next, the network metering service 102 may determine the total bandwidth usage for all data flows. The ratio of these two values may be defined as the blended unit cost of bandwidth, as illustrated below in Equation 1.

$$\text{Blended Unit Cost} = \frac{\text{Total Bandwidth Cost}}{\sum_{flows} \text{Data Usage}} \quad \text{(Equation 1)}$$

The blended unit cost, as described above and illustrated in Equation 1, may be the unit cost of transferring data utilizing the available network bandwidth if all bytes transferred are treated equally (e.g., cost uniformity). However, this calculated blended unit cost may be adjusted, as will be described below, based at least in part on the P2A score and correlation coefficient for each customer 104 of the computing resource service provider. For instance, the network metering service may enable an administrator of the computing resource service provider to apply a cost burden or discount based at least in part on the network bandwidth usage of each customer 104.

After the network metering service 102 has computed the blended unit cost of network bandwidth, the network metering service 102 may calculate the P2A for each data transfer usage flow. In order to determine the P2A for each customer 104, the network metering service 102 may examine the network bandwidth usage for the customer 104 to determine the $99^{th}$ percentile peak usage for the customer 104. The network metering service 102 may then determine, based at least in part on the total network bandwidth usage, an average peak usage for the computing resource service provider network over the same time period. The P2A may then be calculated by obtaining the ratio of this $99^{th}$ percentile peak usage for each customer 104 to the average peak usage for the computing resource service provider network.

The network metering service 102 may next compute the correlation coefficient (defined using the variable r) for each data transfer usage flow with the total network bandwidth usage. The correlation coefficient may be defined as a statistical relationship between two comparable time series sets of data. The correlation coefficient may lie in the range of −1 to +1, as the probability that the two data sets relate to each other. For instance, a negative correlation coefficient may be indicative of a consistent mismatch between the two data sets. For example, if there is a peak in total network bandwidth usage at particular times, the network bandwidth usage for the customer 104 may present one or more valleys during these particular times. Conversely, a positive correlation coefficient may suggest that the total network bandwidth usage and the network bandwidth usage for the customer 104 may be closely related, such that peak usage is consistent for both sets of data. A correlation coefficient that is close to zero may indicate that the customer's 104 network bandwidth usage is random and thus bears no correlation with the total network bandwidth usage.

Once the network metering service 102 has obtained the P2A score and the correlation coefficient for each customer 104 data flow (e.g., customer's network bandwidth utilization for a particular service, covering inbound and outbound network traffic), the network metering service 102 may calculate the cost burden for each customer 104 to identify one or more customers 104 whose bandwidth usage correlates in a specified direction with bandwidth usage. For instance, the network metering service 102 may utilize a unit cost burden equation, such as Equation 2 below, to compute the unit cost burden for each customer 104. The unit cost burden may be derived to fit one or more constraints. For instance, a negative cost burden may denote that a customer 104 or usage type should be granted a discount. However, a positive cost burden may denote that the customer 104 or usage type should bear a greater cost burden to cover the cost of infrastructure improvements to support the necessary bandwidth requirements of the computing resource service provider. In an embodiment, the unit cost burden calculation is configured such that the sum total of all burden and discount equals zero. This may ensure that the total network cost remains the same.

$$\text{Unit Cost Burden} = \frac{P2A*(1+r)}{\left(\frac{\sum_{flows}(\text{usage}*P2A*(1+r))}{\sum_{flows}\text{usage}}\right)} - 1 \quad \text{(Equation 2)}$$

In the Equation 2 illustrated above, "P2A" corresponds to the P2A score, "r" corresponds to the correlation coefficient and "usage" refers to the customer's bandwidth usage. Based at least in part on the computed unit cost burden for each customer 104, the network metering service 102 may generate and provide information specifying any set of customers 104 that may have incurred a negative or positive cost burden. Based at least in part on this information, an administrator may determine a cost attribution for each customer 104. For instance, an administrator may obtain, from the network metering service 102, a report specifying which customers 104 should be granted a discount or a greater cost burden. This may enable the administrator to approach a customer 104 that is incurring a greater cost burden and inform the customer 104 of methods that may be utilized to reduce this cost burden. This may have the added benefit of reducing infrastructure enhancements in order to provide sufficient network bandwidth for such customers 104.

In an embodiment, based at least in part on the computed unit cost burden for each customer 104, the network metering service 102 transmits one or more executable instructions to an accounting system that may cause the accounting system to be updated. This update may cause the accounting system to apply an increase on the unit price for the customer's 104 bandwidth usage if the customer's unit cost burden is greater than zero. Alternatively, the update may cause the accounting system to apply a discounted rate for the bandwidth usage of the customer 104 if the customer's unit cost burden is less than zero. In an embodiment, the update further causes the accounting system to create or adjust a variable pricing schema for customers 104 based at least in part on various factors of bandwidth usage. For instance, if a customer 104 requests bandwidth usage during peak times, the accounting system may apportion a higher bandwidth cost to the customer 104. Alternatively, if the customer 104 requests bandwidth usage during off-peak times, the accounting system may apportion a reduced bandwidth cost to the customer 104. The accounting system may also develop a pricing schema such that a cost may be apportioned to the customer 104 dependent on the particular time and proposed usage specified by the customer 104.

Figure 2:
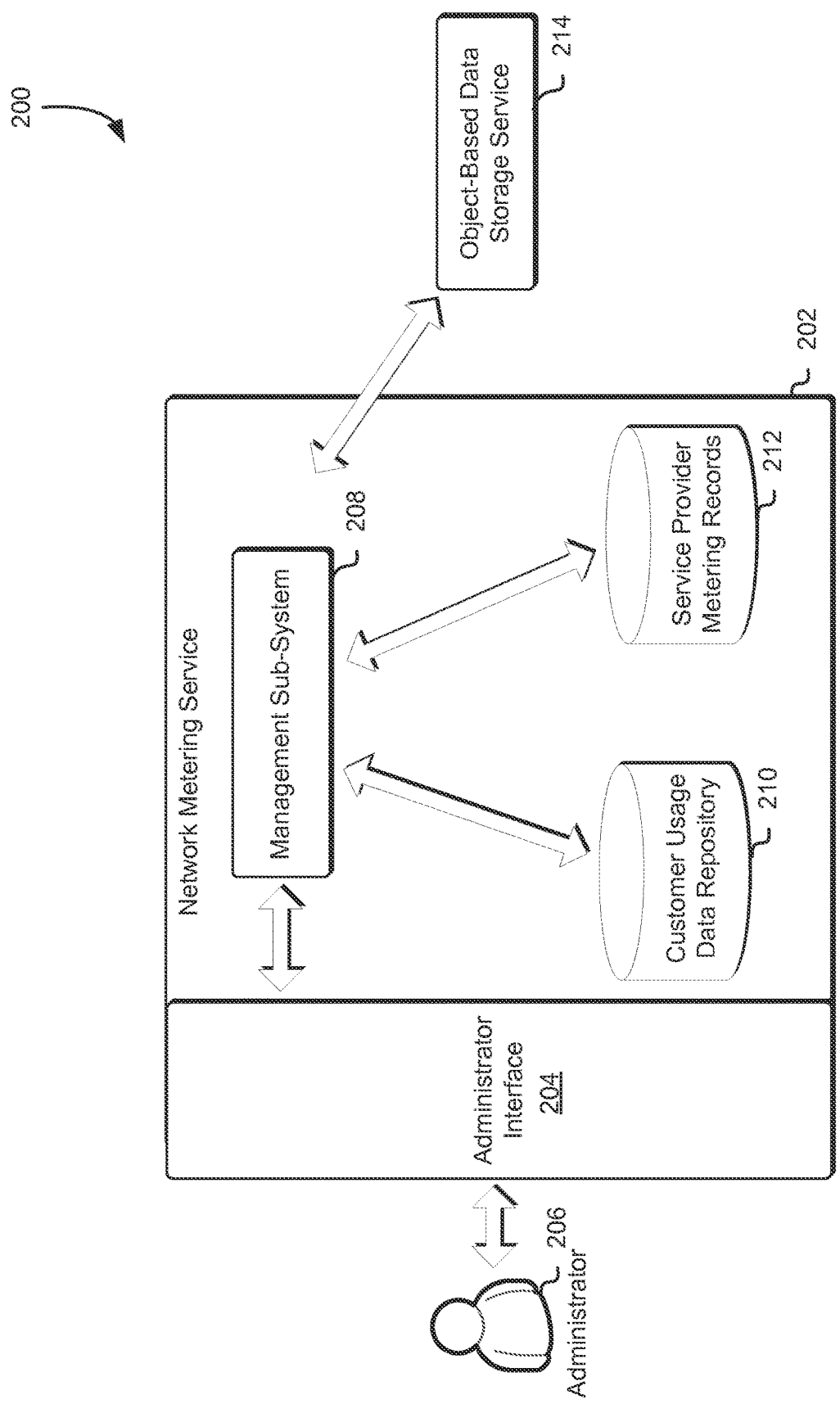
FIG. 2 shows an illustrative example of an environment that includes various components of a network metering service collectively configured to determine the cost burden for one or more customers in accordance with at least one embodiment.

As noted above, a computing resource service provider may utilize a network metering service to determine the network bandwidth usage cost burden for each customer of the computing resource service provider. This determined cost burden may be utilized to provide customers with a discount or an increased cost burden based at least in part on each customer's usage of the network bandwidth. Accordingly, FIG. 2 shows an illustrative example of an environment 200 that includes various components of a network metering service 202 collectively configured to determine the cost burden for one or more customers in accordance with at least one embodiment. The network metering service 202 may comprise an interface 204 that may be made available to administrators 206 employed by the computing resource service provider to request a cost burden analysis for each customer of the computing resource service provider. The interface 204 may comprise certain security safeguards to ensure that the administrator 206 has authorization to access the network metering service 204. For instance, in order to access the network metering service 202, an administrator 206 may need to provide a username and a corresponding password or encryption key when using the interface 204. Additionally, requests (e.g., API calls) submitted to the interface 204 may require an electronic signature generated using a cryptographic key such that the electronic signature is verifiable by the network metering service 202, such as by an authorization system (not shown).

Through the interface 204, the administrator 206 may submit a request to obtain a cost burden assignment for each customer of the computing resource service provider. The network metering service 202 may include a management sub-system 208 that may be configured to receive the request received through the interface 204. Upon receiving the request from the interface 204, the management sub-system 208 may communicate with an object-based data storage service 214 to retrieve the raw metering records for the computing resource service provider network. In some embodiments, the management sub-system 208 may communicate with the object-based data storage service 214 without any interaction with the interface 204 (e.g., without an administrator 206 request). For instance, the management sub-system 208 may be configured to obtain the raw metering records from the object-based data storage service 214 at certain time intervals (e.g., every 90 days, etc.) or in response to a triggering event (e.g., existing network bandwidth has been exceeded, resulting in service lag). While an object-based data storage service 214 is used throughout the present disclosure for the purpose of illustration, it should be noted that the raw metering records may be stored within any data storage service, such as a block-level data storage service.

Once the management sub-system 208 has obtained the raw metering records from the object-based data storage service 214, the management sub-system 208 may utilize a map reduce process to aggregate these metering records at a certain level of granularity. Additionally, the management sub-system 208 may categorize the data usage for each computing resource service flow. These aggregated metering records may be stored within a service provider metering records data store 212 provided by the network metering service 202 for further analysis. The management sub-system 208 may also utilize this map reduce process to obtain metering data for each customer of the computing resource service provider. This metering data may be stored within a customer usage data repository 210 provided by the network metering service 202.

In response to the administrator 206 request or as a result of a triggering event or scheduled time period, the management sub-system 208 may determine the total network bandwidth cost. The management sub-system 208 may obtain the aggregated metering records from the service provider metering records data store 212 and proceed to calculate a blended unit cost of bandwidth for the computing resource service provider network. In order to determine the blended unit cost of bandwidth, the management sub-system 208 may first calculate the total bandwidth cost for all data flows from customers of the computing resource service provider and the one or more computing resource services provided by the computing resource service provider. Next, the management sub-system 208 may determine the total bandwidth usage for all data flows. Utilizing Equation 1 described above, the management sub-system 208 may calculate the blended unit cost of bandwidth for a specific data transfer usage type.

Once the management sub-system 208 has calculated the blended unit cost of bandwidth for the computing resource service provider network, the management sub-system 208 may calculate the P2A score and the correlation coefficient for each customer of the computing resource service provider. As noted above, the P2A score may be calculated as a ratio of a customer's $99^{th}$ percentile peak data usage at a certain level of granulation to the average data usage peak for the entire computing resource service provider network over the duration of the data sets. Additionally, the management sub-system 208 may calculate a correlation coefficient for each customer based at least in part on the statistical relationship between each customer's network usage data from the customer usage data repository 210 and the total network usage over the same time period. As noted above, a positive correlation coefficient may denote a close relationship between the two data sets. Alternatively, a negative correlation coefficient may denote a tendency for the pair of data to consistently move in opposite directions. A correlation coefficient that is near zero may denote that the customer data is random and thus bears no statistical relationship with the total network usage.

The management sub-system 208 may be configured to utilize both the calculated P2A score and the correlation coefficient to determine the unit cost burden for each customer of the computing resource service provider. For instance, the management sub-system 208 may utilize Equation 2 as described above to calculate the unit cost burden for each customer. Once the management sub-system 208 has determined the unit cost burden for each customer, the management sub-system 208 may store these values for each customer within the customer usage data repository 210. Thus, if an administrator 206 submits a request, via the interface 204, for cost burden analysis data for various customers of the computing resource service provider, the management sub-system 208 may access the customer usage data repository 210 and obtain the unit cost burden values for these specified customers and provide this data to the administrator 206 through the interface 204.

Figure 6:
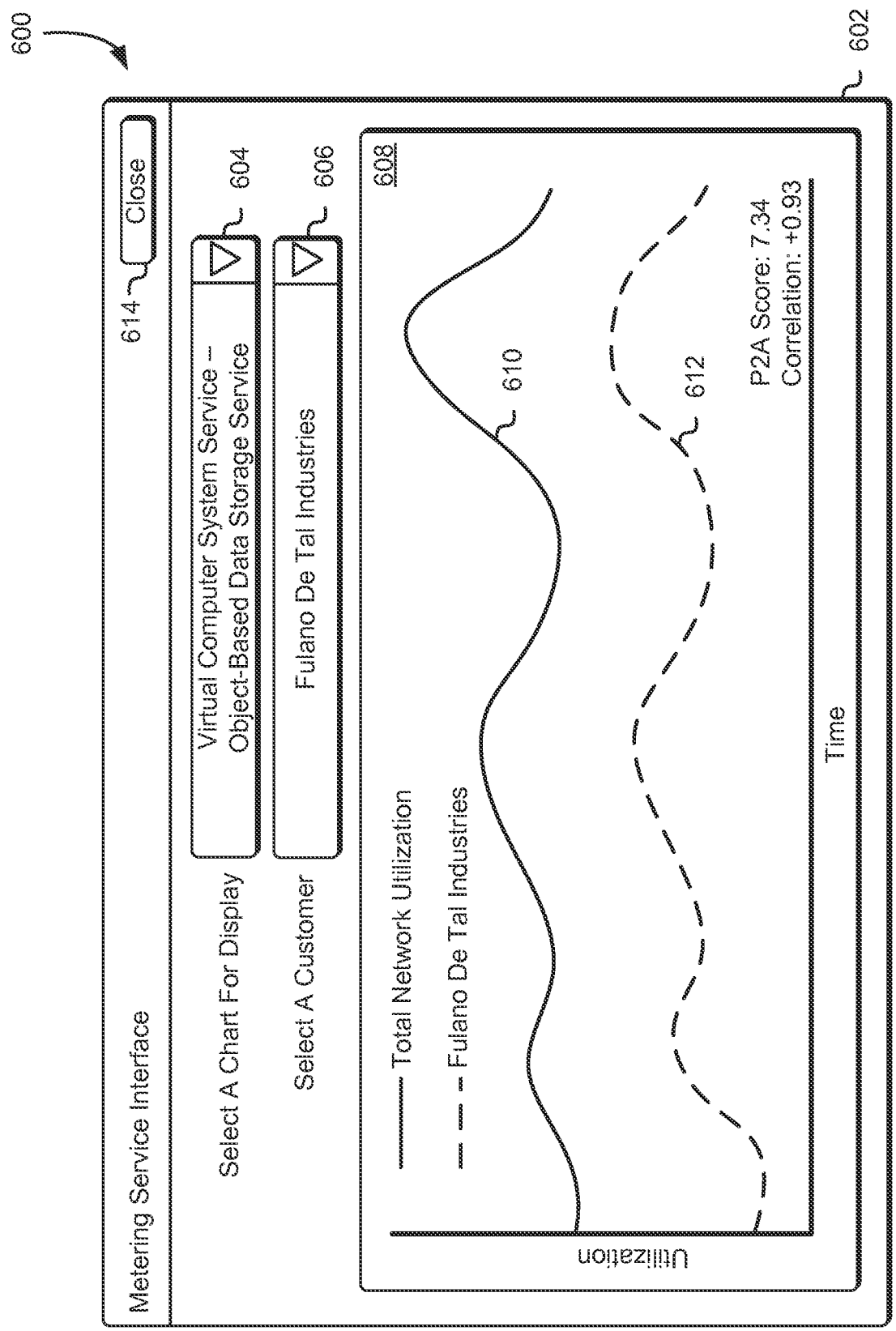
FIG. 6 shows an illustrative example of an environment that includes an interface usable for viewing one or more charts for calculating peak-to-average values and correlation coefficients for one or more users.

As will be described in greater detail below in connection with FIG. 6, the interface 204 may further enable an administrator 206 to request creation of one or more charts usable to visualize customer data usage compared to total network bandwidth usage across the computing resource service provider network. Additionally, these charts may specify the P2A score, correlation coefficient and unit cost burden for the selected customer. This may enable the administrator 206 to visualize how the unit cost burden was computed and determine a cost attribution for each customer of the computing resource service provider.

Figure 3:
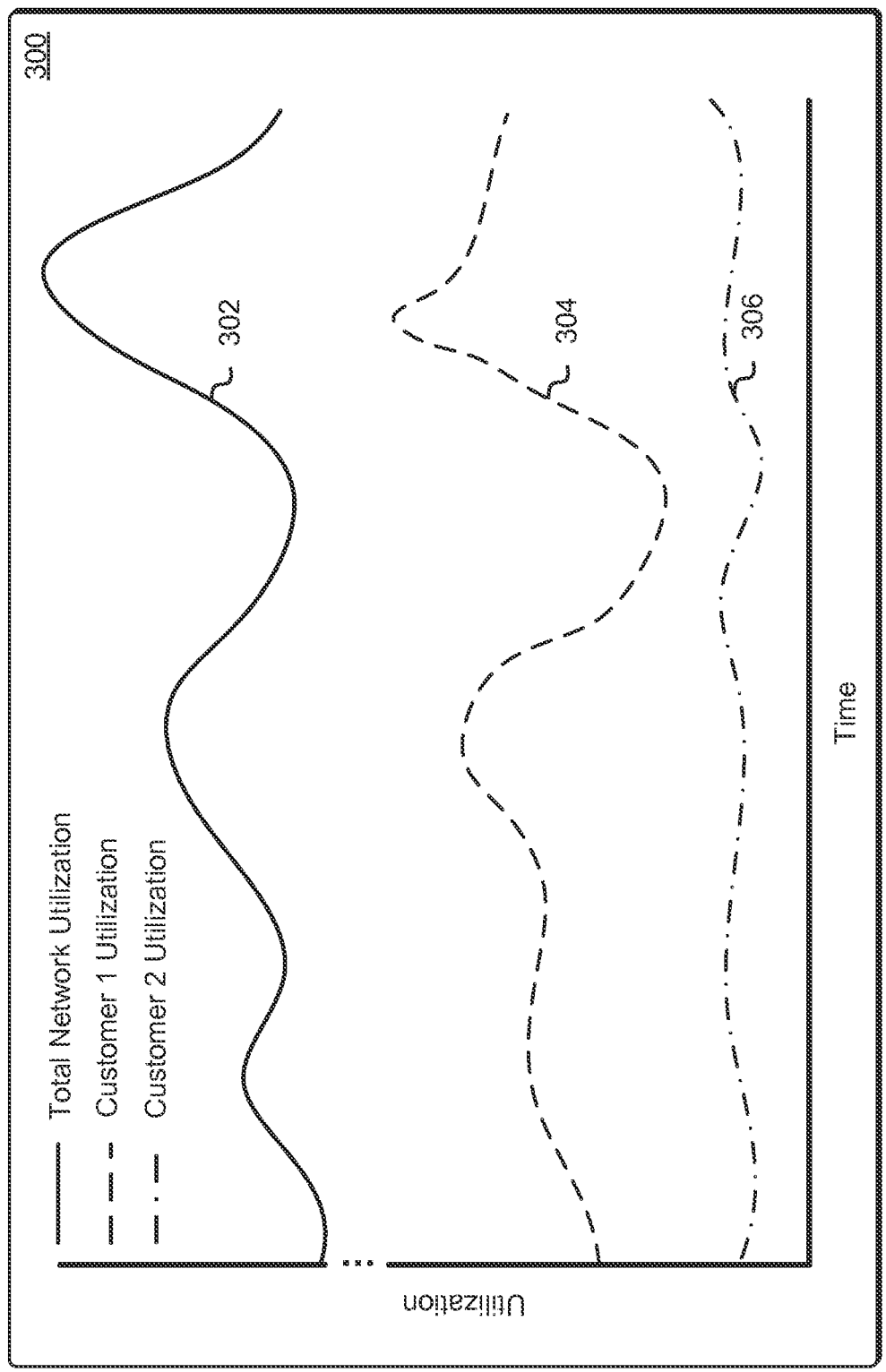
FIG. 3 shows an illustrative example of a chart for determining a peak-to-average value based at least in part on network utilization for one or more customers in accordance with at least one embodiment.

As noted above, the network metering service may compare network bandwidth usage data for each customer and compare this data to the total network bandwidth usage over the same period of time to determine a P2A score for each customer. Accordingly, FIG. 3 shows an illustrative example of a chart 300 for determining a peak-to-average value based at least in part on network utilization for one or more customers in accordance with at least one embodiment. In the chart 300, the network metering service has determined the total network bandwidth utilization over a certain period of time, as illustrated by line 302. Additionally, the network metering service has determined, based at least in part on the raw metering records obtained from the object-based data storage service, the network bandwidth utilization for two customers: Customer 1 and Customer 2. While data associated with two customers is utilized for the purpose of illustration, it should be noted that the network metering service may evaluate data for myriad customers including, and up to, all customers of the computing resource service provider.

As illustrated in the chart 300, Customer 1 may have contributed a significant amount to the total network bandwidth utilization over a period of time. For instance, as denoted by line 304, Customer 1's network bandwidth utilization closely mirrors the total network bandwidth utilization over the same period of time. For example, as illustrated in the chart 300, the line 304 shows a peak network bandwidth utilization for Customer 1 at about the same time as a peak in the total network bandwidth utilization across the entire computing resource service provider network. The Customer 1 network bandwidth utilization peak may indicate that Customer 1's utilization is driving the total network bandwidth utilization peak and, thereby, exceed the average bandwidth utilization for these time periods.

Alternatively, as illustrated in chart 300, Customer 2 may have contributed a small amount to the total network bandwidth utilization over the same period of time. Customer 2's network bandwidth utilization may be flat throughout the entire time period, as denoted by line 306, which may indicate that Customer 2's utilization may not be driving the various peaks in the total network bandwidth utilization. Thus, Customer 2's network bandwidth utilization may not exceed the average bandwidth utilization for these time periods, since Customer 2's utilization is relatively minimal compared to Customer 1 and the total network bandwidth utilization.

Figure 4:
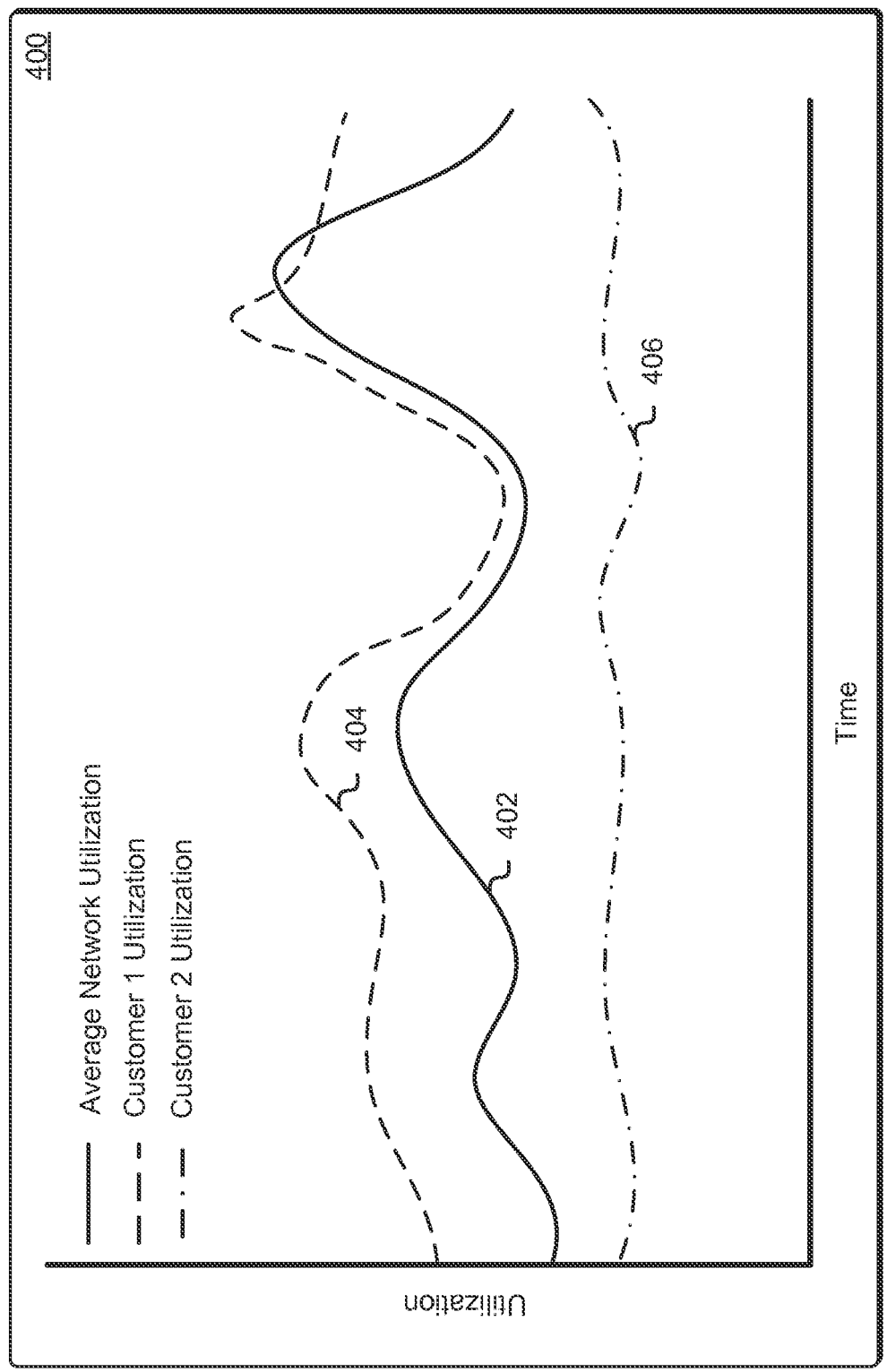
FIG. 4 shows an illustrative example of a chart for determining a peak-to-average value based at least in part on network utilization for one or more customers in accordance with at least one embodiment.

Once the network metering service has obtained all customer network bandwidth utilization data from the object-based data storage service, the network metering service may determine the average total network bandwidth utilization over a certain period of time. The network metering service may utilize this average network bandwidth utilization data, along with a customer's network bandwidth utilization data to determine the P2A score for the customer. Accordingly, FIG. 4 shows an illustrative example of a chart 400 for determining a peak-to-average value based at least in part on network utilization for one or more customers in accordance with at least one embodiment. As illustrated in the chart 400, the network metering service has generated the line 402 based at least in part on a calculation of the average network bandwidth utilization for the computing resource service provider network. The line 402 may include various data peaks and valleys based at least in part on the average bandwidth utilization during certain time periods.

As illustrated in chart 400, Customer 1's network bandwidth utilization over the same period of time, represented using line 404, typically exceeds the average bandwidth utilization for all customers of the computing resource service provider. In order to determine the total P2A score for Customer 1, the network metering service may evaluate the $99^{th}$ percentile peaks aggregated at five-minute intervals and compare these peaks to the average peak utilization for all customers of the computing resource service provider during the same time period. A P2A score may be obtained by dividing the $99^{th}$ percentile peak utilization by the average peak utilization during the same time period. Thus, a P2A score that is greater than one may denote that more routers may need to be installed to provide sufficient bandwidth to address these network peaks.

The network metering service may utilize one or more methods to obtain an aggregate P2A score for each customer. For instance, in an embodiment, the network metering service may utilize the one or more P2A scores for each peak to identify a maximum P2A score over the specified time period. The network metering service may then assign a total P2A score that is equal to this maximum P2A score. Alternatively, the network metering service may utilize these individual P2A scores to calculate a total P2A score that is based at least in part on the average of these individual P2A scores. For example, Customer 1's network bandwidth utilization, as represented by line 404, may result in a P2A score that is greater than one. This may serve as an indication that Customer 1 should bear a greater cost burden than other customers.

As an alternative example, Customer 2's network bandwidth utilization, as represented by line 406, may be substantially below the average network bandwidth utilization for the computing resource service provider network. Additionally, Customer 2's network bandwidth utilization may not include any significant peaks, which may result in a low $99^{th}$ percentile peak. Thus, it may be expected that Customer 2's P2A score will likely be below one. Thus, this may denote that Customer 2 would not have a negative impact on the bandwidth requirements for the computing resource service provider and thus should not have a greater cost burden applied to him/her.

Figure 5:
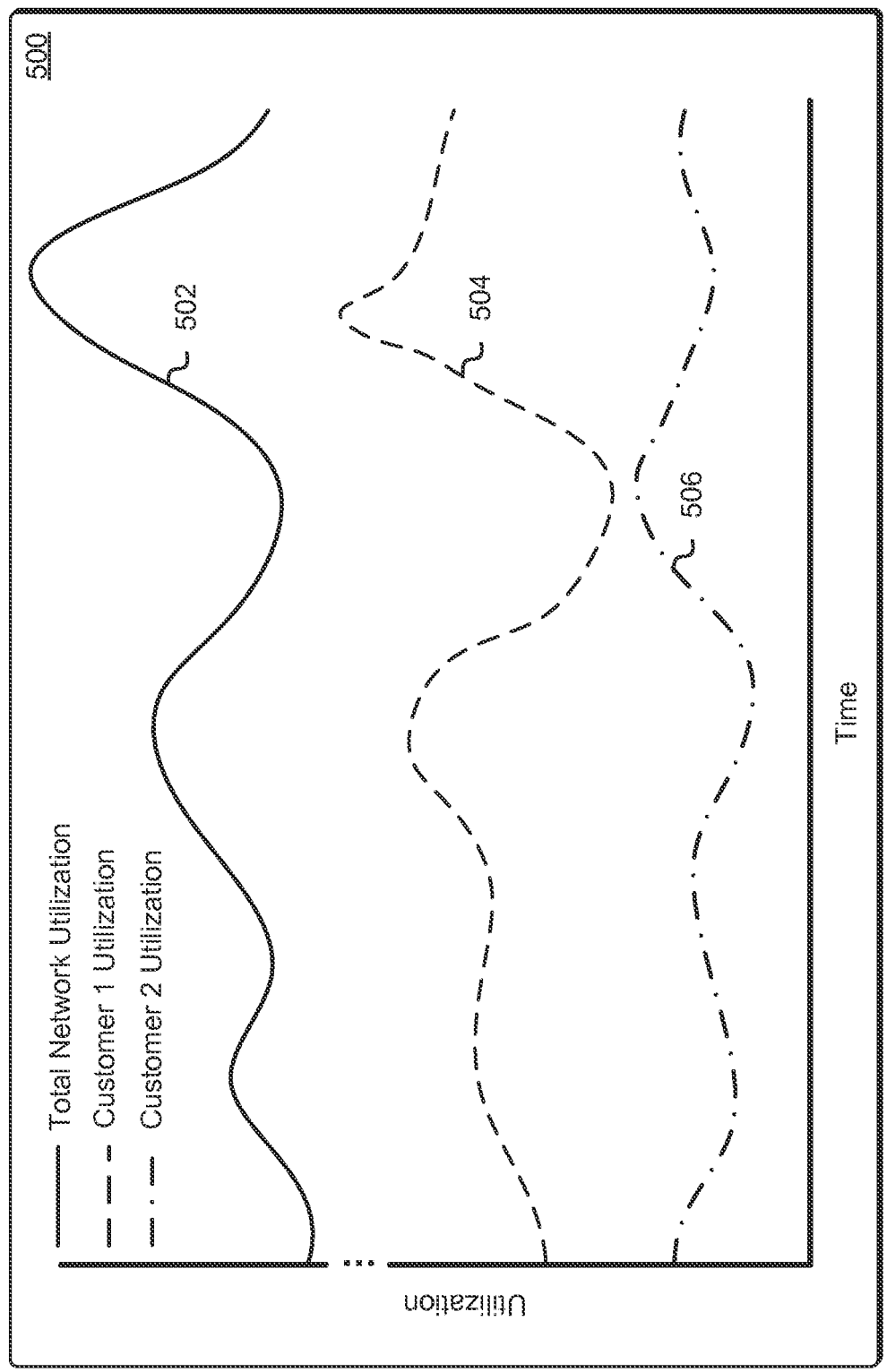
FIG. 5 shows an illustrative example of a chart for determining a correlation coefficient based at least in part on network utilization for one or more customers in accordance with at least one embodiment.

As noted above, the calculation of the unit cost burden for each customer of the computing resource service provider may be a function of both the P2A score and the correlation coefficient determined by the network metering service. The P2A score and the correlation coefficient may both be calculated based at least in part on the network bandwidth utilization of each customer and the total network bandwidth utilization across the computing resource service provider network. Accordingly, FIG. 5 shows an illustrative example of a chart 500 for determining a correlation coefficient based at least in part on network utilization for one or more customers in accordance with at least one embodiment. Correlation may be a statistical relationship between two comparable time series data. For instance, correlation may be determined between a customer's network bandwidth utilization and the total network bandwidth utilization over the same time period.

The correlation coefficient, which may lie in the range of −1 to +1, may be defined at the probability that the two data sets relate to each other. For instance, a negative correlation coefficient may suggest that one member of the pair of data sets consistently move in opposite directions. For example, if the total network bandwidth utilization over a particular time period includes various peaks at certain times, at these same moments in time, a customer's utilization may demonstrate various valleys, in contradiction to these peaks. Thus, this customer's correlation coefficient may be negative.

Alternatively, a positive correlation coefficient may suggest that there is a tendency for the pair of data sets to move in tandem and in the same direction. Using the example described above, if the customer's utilization demonstrates various peaks at the same moments in time that the total network bandwidth utilization also exhibits these peaks, the correlation coefficient may be deemed to be positive and closer to +1. As the correlation coefficient approaches zero, the two data sets have lower correlation, whereby a coefficient of zero denotes no correlation whatsoever between the two data sets. Thus, a customer's utilization may be random in such circumstances.

Turning to the chart 500, the total network bandwidth utilization, as represented by line 502, exhibits certain peaks and valleys over a particular period of time. Customer 1's network bandwidth utilization, as represented by line 504, may also include various peaks and valleys over the same period of time. These peaks and valleys may be similar to the peaks and valleys for the total network bandwidth utilization. Thus, Customer 1's network bandwidth utilization may produce a positive correlation reading, since there may be a tendency for Customer 1's usage to follow the same pattern as the total network utilization over the same period of time. This may indicate that Customer 1's network bandwidth utilization is driving the total bandwidth utilization peaks. Thus, a higher correlation coefficient may result in a greater cost burden for the customer. Further, this may enable an administrator to notify Customer 1 of his/her patterns of usage and suggest utilizing distribution of network traffic throughout and, thus, lower his/her peak utilization and drive the overall cost of the network down. For instance, the administrator may notify Customer 1 to suggest altering his/her network bandwidth utilization such that the particular network bandwidth is used during non-peak time periods, resulting in a reduction in correlation coefficient values and P2A.

As an alternative example, Customer 2's network bandwidth utilization, as represented by line 506 on chart 500, may exhibit peaks and valleys in direct opposition to the total network bandwidth utilization, represented by line 502. For instance, peak utilization by Customer 2 may occur at the same time of a lull in bandwidth usage for the computing resource service provider network. Additionally, a lull in Customer 2's bandwidth utilization may occur at the same time as a peak in total bandwidth utilization for the network. Thus, Customer 2's network bandwidth utilization may result in a negative correlation coefficient. Since Customer 2 may not be responsible for driving the peaks in total network bandwidth utilization, he/she may be provided with a discounted rate and further encouragement to maintain such usage trends.

As noted above, the network metering service may include an interface, which an administrator may utilize to obtain the P2A score and correlation coefficient for one or more customers, as well as the calculated unit cost burden for these one or more customers. Additionally, the administrator may utilize this interface to visualize each customer's network bandwidth utilization over a particular period of time in comparison to the total network bandwidth utilization. Accordingly, FIG. 6 shows an illustrative example of an environment 600 that includes an interface 602 usable for viewing one or more charts for calculating P2A values and correlation coefficients for one or more users (e.g., customers of the computing resource service provider, which may include individuals and/or organizations).

The interface 602 may include a plurality of components, which an administrator may utilize to create a visualization of a customer's network bandwidth utilization and obtain the P2A score, correlation coefficient and unit cost burden for the customer. For instance, the network metering service interface 602 may include a chart selection menu 604, which may be utilized to select the type of network utilization to be analyzed. For instance, as illustrated in FIG. 6, the administrator has utilized the chart selection menu 604 to generate a chart for virtual computer system service to object-based data storage service data flows over the computing resource service provider network. In an embodiment, the interface 602, in response to the administrator's selection of a particular chart through the chart selection menu 604, transmits a request to a management sub-system of the network metering service to obtain network bandwidth utilization data pertaining to the chart selection made by the administrator. This may cause the management sub-system to access a service provider metering records data store, as illustrated in FIG. 2, to obtain the requested network bandwidth utilization data and provide this data to the interface 602. This may enable the interface 602 to generate a chart (as will be described below) that includes a data line illustrating the requested network bandwidth utilization data.

The interface 602 may further include a customer selection menu 606, which may be utilized to select the customer for whom network bandwidth utilization will be evaluated against the selected total network utilization type. In response to this selection, the interface 602 may transmit a request to the management sub-system of the network metering service to obtain the customer network bandwidth utilization data associated with the selected chart type. The management sub-system may access a customer usage data repository, as illustrated in FIG. 2, to obtain the customer bandwidth utilization data for the particular customer specified within the customer selection menu 606 and provide this data to the interface 602.

The interface 602 may include a chart window 608, which may be configured to display one or more charts based at least in part on the selections made by the administrator through use of the chart selection menu 604 and the customer selection menu 606. For instance, as illustrated in FIG. 6, the chart window 608 may be configured to display a chart that includes a total network utilization line 610 and a customer network utilization line 612. These two lines 610, 612 may be included within the chart utilizing a chart scale (e.g., utilization metric over time, as illustrated in FIG. 6). While a single chart scale is used throughout the present disclosure for the purpose of illustration, the chart window 608 may be configured to utilize multiple scales to provide greater data clarity. For instance, in an embodiment, the chart window 608 may be configured to define a scale for each data line 610, 612 in a manner that the data lines 610, 612, when presented in the chart window, are overlaid for easier comparison and visualization. This may enable the administrator to quickly identify any trends that may be utilized to obtain the P2A score and correlation coefficient for the selected customer. It should also be noted that while the chart window 608 may be configured to display more than two lines 610, 612. For instance, in an embodiment, an administrator may utilize the customer selection menu 606 to select more than one customer for which data may be obtained and provided to the administrator through the chart window 608.

In addition to the various data lines that may be plotted within the chart window 608, the interface 602 may display, within the chart window 608, the P2A score and correlation coefficient for the selected one or more customers. This may enable the administrator to identify any customers who may be contributing negatively to the hardware and bandwidth shortfalls that may be present at peak times. Alternatively, the administrator may utilize the displayed P2A score and correlation coefficient to identify any customers that do not have a negative impact on peak bandwidth utilization. Thus, an administrator may utilize this information to define a cost attribution for all customers based at least in part on each customer's bandwidth utilization.

The interface 602 may additionally include other elements that may be used to enable the customer or other user to perform alternative actions. For instance, as illustrated in FIG. 6, the interface 602 may include a close button 614. The administrator may utilize a cursor to select the close button 614 and exit the network metering service interface 602 without executing any additional changes to the charts window 608 through use of the chart selection menu 604 and the customer selection menu 606.

Figure 7:
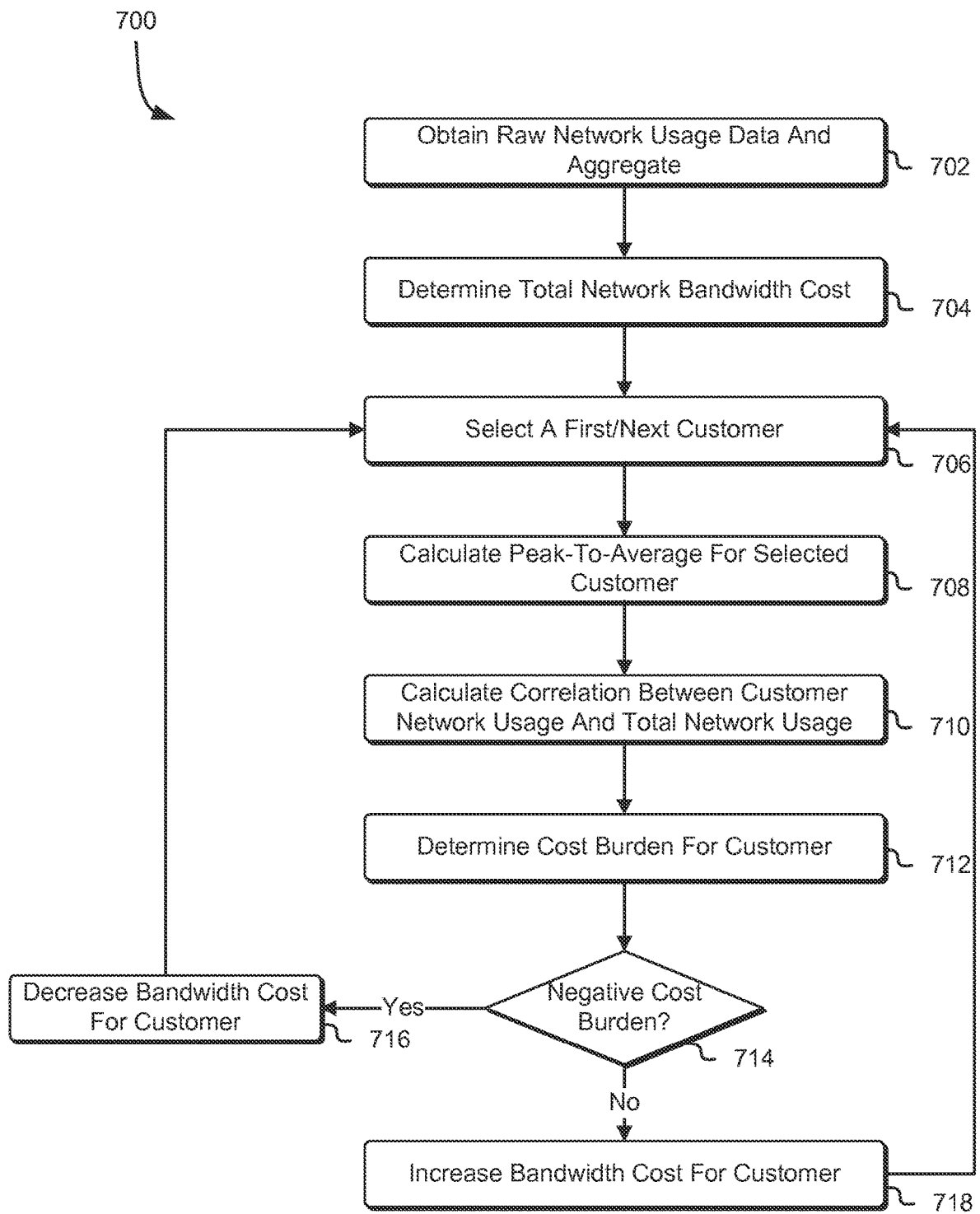
FIG. 7 shows an illustrative example of a process for determining the cost burden for one or more customers based at least in part on the peak-to-average and correlation factor calculated for the customer in accordance with at least one embodiment.

As noted above, the network metering service may be configured to determine, for each customer data flow, a P2A score and a correlation coefficient, which may be based at least in part on a comparison of the customer data flow to the total network bandwidth utilization for all computing resource service provider customers. The P2A score and correlation coefficient may be utilized to determine a unit cost burden for each of these customers, which may be utilized to adjust the cost attribution for each of these customers. Accordingly, FIG. 7 shows an illustrative example of a process 700 for determining the cost burden for one or more customers based at least in part on the peak-to-average score and correlation factor calculated for the customer in accordance with at least one embodiment. The process 700 may be performed by the aforementioned network metering service, which may be configured to obtain raw metering data from an object-based data storage service and aggregate this data to perform the P2A score and correlation coefficient calculations.

The network metering service may be configured to interact with an object-based data storage service to obtain 702 raw network usage data (e.g., metering records). In order to utilize this data, the network metering service may utilize a map reduce process to aggregate these metering records to a certain level of granularity. For instance, the network metering service may aggregate these records at five minute granularity to capture all relevant peak network bandwidth usage for all customers and for the computing resource service provider network as a whole. Further, the aggregated metering records may be categorized by each computing resource service flow for all data regions. This may enable an administrator to develop a pricing schema per service and per data region.

Once the network metering service has obtained the raw network usage data from the object-based data storage service, aggregated this data and categorized the data for each service flow and data region, the network metering service may determine 704 the total network bandwidth cost. For instance, in an embodiment, the network metering service calculates a blended unit cost of bandwidth for each data flow. As noted above, the blended unit cost of bandwidth, as represented in Equation 1, is the unit cost of transferring a certain number of bytes (e.g., kilobytes, megabytes, etc.) using the network if all bytes transferred were to be treated equally. In order to obtain the blended unit cost of bandwidth, the network metering service may first obtain the total network bandwidth cost across all services provided by the computing resource service provider. Subsequently, the network metering service may calculate the total bandwidth usage for all customers for a particular service. The ratio of these two values may be defined as the blended unit cost of bandwidth.

The network metering service may next access the customer usage data repository and select 706 a first customer in order to determine his/her cost burden. Once the network metering service has selected a first customer from all the customers of the particular service, the network metering service may evaluate the selected customer's data usage in comparison to the total bandwidth utilization for all customers of the particular service to determine 708 a P2A score for the selected customer. As noted above, the network metering service may calculate the P2A score for a particular customer by first examining the network bandwidth usage for the selected customer to determine the $99^{th}$ percentile peak usage for the customer. The network metering service may then determine, based at least in part on the total network bandwidth usage, an average peak usage for the computing resource service provider network over the same time period. The P2A may then be calculated by obtaining the ratio of this $99^{th}$ percentile peak usage for the customer to the average peak usage for the computing resource service provider network over the same time period. In an embodiment, the network metering service obtains intermediate P2A scores for each $99^{th}$ percentile peak over a period of time and utilizes the maximum intermediate P2A score as the P2A score for the customer. Alternatively, the network metering service may average these intermediate P2A scores to obtain the composite P2A score for the customer.

Once the network metering service has calculate the P2A score for the selected customer, the network metering service may next determine the correlation coefficient for the particular customer data flow. As noted above, the correlation coefficient may be defined as a statistical relationship between two comparable time series sets of data. The correlation coefficient may lie in the range of −1 to +1, as the probability that the two data sets (e.g., customer's data flow and the total network bandwidth utilization) relate to each other. For instance, a negative correlation coefficient may be indicative of a consistent mismatch between the two data sets. For example, if there is a peak in total network bandwidth usage at particular times, the network bandwidth usage for the customer may present one or more valleys during these particular times. Conversely, a positive correlation coefficient may suggest that the total network bandwidth usage and the network bandwidth usage for the customer may be closely related, such that peak usage is consistent for both sets of data. A correlation coefficient that is close to zero may indicate that the customer's network bandwidth usage is random and thus bears no correlation with the total network bandwidth usage.

As noted above, the unit cost burden for a customer, as defined in Equation 2, is a function of the P2A score and correlation coefficient for the customer. Thus, once the network metering service has obtained the P2A score and correlation coefficient for the customer, the network metering service may utilize the formula defined as Equation 2 to determine 712 the unit cost burden for the selected customer. The unit cost burden may be derived to fit one or more constraints. For instance, a negative cost burden may denote that a customer or usage type should be granted a discount. However, a positive cost burden may denote that the customer or usage type should bear a greater cost burden to cover the cost of infrastructure improvements to support the necessary bandwidth requirements of the computing resource service provider. In an embodiment, the unit cost burden calculation is configured such that the sum total of all burden and discount equals zero. This may ensure that the total network cost remains the same.

Based at least in part on the calculation of the unit cost burden for the selected customer, the network metering service may determine 714 if this customer has incurred a negative cost burden. If the calculated unit cost burden is negative, the network metering service may decrease 716 the bandwidth cost (e.g., provide a discount) for the selected customer. In an alternative embodiment, the network metering service, instead of decreasing the bandwidth cost for the customer, will notify an administrator of the computing resource service provider to enable the administrator to select the course of action. For instance, the administrator may utilize this calculated unit cost burden to identify any trends in bandwidth usage that may be used to prepare customer recommendations and techniques for bandwidth usage that may reduce customer and network costs.

If the customer has not incurred a negative cost burden (e.g., the calculated unit cost burden is positive), the network metering service may increase 718 the bandwidth cost for the customer, as the selected customer's bandwidth usage may be driving the need of the computing resource service provider to obtain more resources to handle peak bandwidth usage. In an alternative embodiment, the network metering service will notify the administrator of the computing resource service provider of the customer's positive unit cost burden to enable the administrator to prepare a plan of action to address this issue. For instance, the administrator may provide the customer with recommendations to reduce the customer's usage of the network bandwidth at peak times or promote more efficient use of the bandwidth.

In an embodiment, the network metering service, upon determining that a customer has incurred a positive unit cost burden, will throttle the customer's usage of the network bandwidth at peak times to reduce the customer's calculated unit cost burden. Such action may reduce the bandwidth utilization at peak times and thus reduce the dependence on hardware expansions to provide sufficient bandwidth for all customers. Additionally, this may serve as an indication to the customer to reduce his/her bandwidth usage or seek more efficient use of the available bandwidth.

Once the network metering service has taken action based at least in part on the determined unit cost burden for the selected customer, the network metering service may select 706 another customer from the pool of customers to determine the unit cost burden for this customer. In this manner, the network metering service may identify any customers that are producing a negative impact on the provisioning of hardware resources to satisfy the demand for network bandwidth. Additionally, once the network metering service has calculated the unit cost burden for all customers, the network metering service may obtain the sum of the calculated values to determine if the sum is equal to zero, per the constraint established for calculating the unit cost burden. If the sum is equal to zero, then the unit cost burden calculated may be deemed to have been performed correctly. Otherwise, the network metering service, through an administrator or through an automated process, may adjust the unit cost burden equation (e.g., Equation 2) to ensure that the unit cost burden across all customers is equal to zero.

Figure 8:
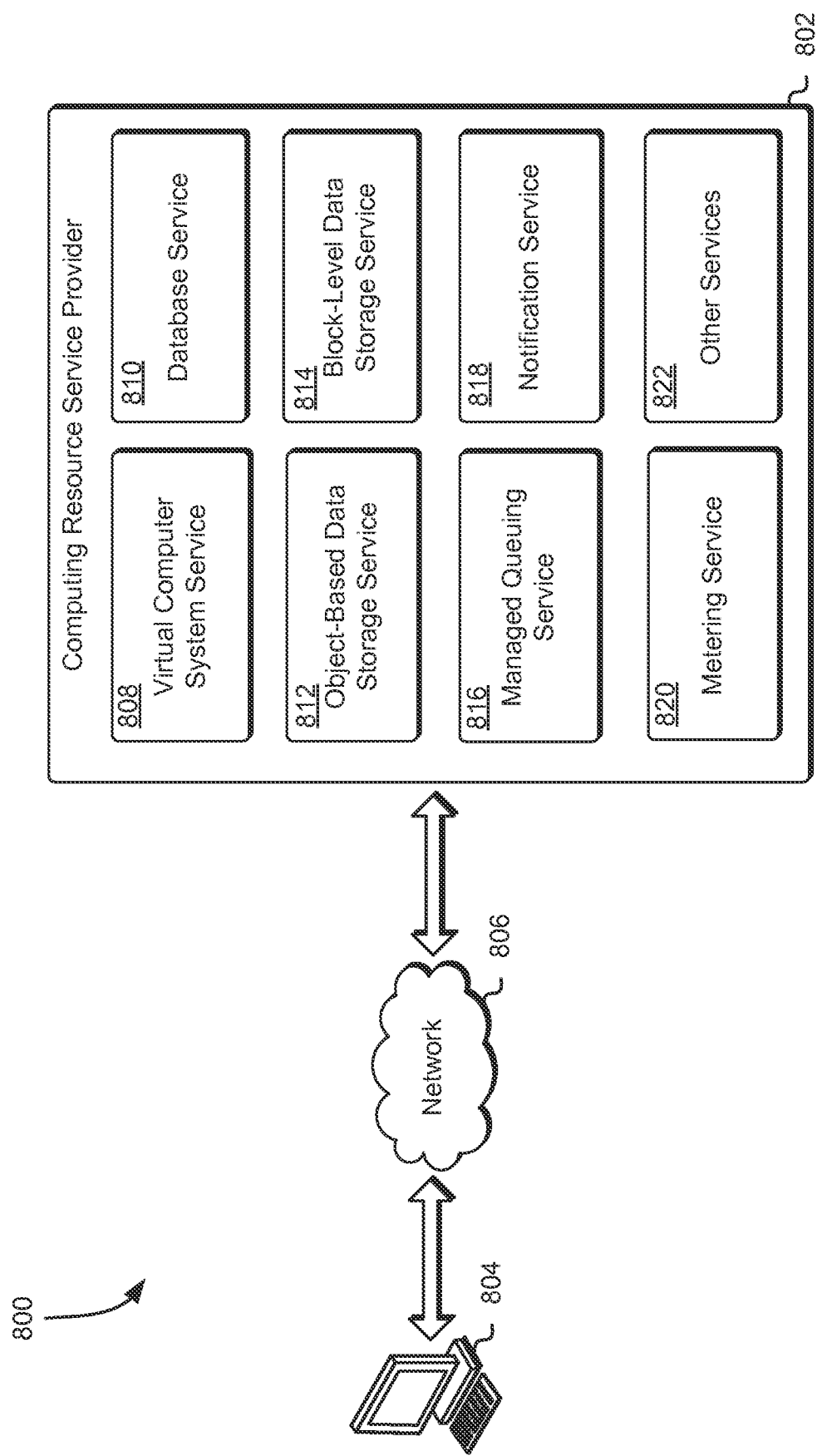
FIG. 8 shows an illustrative example of an environment in which various embodiments can be implemented.

FIG. 8 shows an illustrative example of an environment 800 in which various embodiments can be implemented. In the environment 800, a computing resource service provider 802 may provide a variety of services to a customer 804 or other users. The customer 804 may be an organization that may utilize the various services provided by the computing resource service provider 802 to remotely generate and maintain one or more resources and provide a mapping of user roles for use within a customer network to enable management of one or more delegated access permissions to define a level of access for users of his or her resources. As illustrated in FIG. 8, the customer 804 may communicate with the computing resource service provider 802 through one or more communications networks 806, such as the Internet. Some communications from the customer 804 to the computing resource service provider 802 may cause the computing resource service provider 802 to operate in accordance with various techniques described herein or variations thereof.

As noted above, a computing resource service provider 802 may provide various computing resource services to its customers. For instance, in this particular illustrative example, the computing resource service provider 802 provides at least seven types of services. The services provided by the computing resource service provider, in this example, include a virtual computer system service 808, a database service 810, an object-based data storage service 812, a block-level data storage service 814, a managed queuing service 816, a notification service 818, a network metering service 820 and one or more other services 822, although not all embodiments of the present disclosure will include all such services and additional services may be provided in addition to or as an alternative to services explicitly described herein.

The virtual computer system service 808 may be a collection of computing resources configured to instantiate virtual machine instances onto virtual computer systems on behalf of the customers 804 of the computing resource service provider 802. Customers 804 of the computing resource service provider 802 may interact with the virtual computer system service 808 to provision and operate virtual computer systems that are instantiated on physical computing devices hosted (e.g., physical hosts) and operated by the computing resource service provider 802. The virtual computer systems may be used for various purposes, such as to operate as servers supporting a website. Other applications for the virtual computer systems may be to support database applications, electronic commerce applications, business applications and/or other applications.

The database service 810 may be a collection of computing resources that collectively operate to run one or more databases for one or more customers 804. Customers 804 of the computing resource service provider 802 may operate and manage a database from the database service 810 by utilizing appropriately configured API calls. This, in turn, may allow a customer 804 to maintain and potentially scale the operations in the database.

The object-based data storage service 812 may comprise a collection of computing resources that collectively operate to store data for a customer 804. The data stored in the data storage service 812 may be organized into data objects. The data objects may have arbitrary sizes except, perhaps, for certain constraints on size. Thus, the object-based data storage service 812 may store numerous data objects of varying sizes. The object-based data storage service 812 may operate as a key value store that associates data objects with identifiers of the data objects which may be used by the customer to retrieve or perform other operations in connection with the data objects stored by the object-based data storage service 812. Access to the object-based data storage service 812 may be through appropriately configured API calls.

The block-level data storage service 814 may comprise a collection of computing resources that collectively operate to store data for a customer. For instance, the block-level data storage system may be configured to provide block-level data storage volumes for use with a virtual machine instance, as noted above. A customer may interact with the block-level data storage service 814 to provision a block-level data storage volume that, in turn, may be mounted as a storage device (e.g., hard drive) onto a virtual machine instance. The storage volume may be configured to behave like a raw, unformatted block storage device with a block level customer interface. Accordingly, a customer, through properly configured API calls to the service, may create a file system on top of the block-level data storage volumes or utilize the volume as a block-level storage device (e.g., a hard drive).

The managed queuing service 816 may be a collection of computing resources configured to enable customers 804 to store one or more messages in queues for use by one or more services provided by the computing resource service provider 802. Each message that is stored in a queue may comprise one or more appropriately configured API calls which, when processed by the recipient service, may cause the service to perform one or more actions. Alternatively, each message may comprise any variation of text, such as programming code, URLs for data objects and other statements.

The notification service 818 may be a collection of computing resources configured to enable customers 804 to send and receive notifications through a communications network 806. A customer 804 may utilize an interface, provided by the computing resource service provider 802, to create or subscribe to one or more subjects to which one or more messages may be published through. For instance, a customer 804 may use the interface to create a new subject and subscribe to this subject by specifying that any messages published to the subject may be transmitted to a particular location (e.g., electronic mail address, one or more servers, an existing queue within the managed queuing service 816, etc.). Accordingly, when a customer 804 publishes a message to the subject, the message may be transmitted to each recipient subscribed to the subject.

The network metering service 820 may provide a variety of services to enable administrators of the computing resource service provider 802 to determine a cost attribution for one or more customers 804 based at least in part on each customer's bandwidth utilization at certain times. As noted above, the network metering service 820 may be configured to obtain raw metering data from a data storage service, such as the object-based data storage service 812 or the block-level data storage service 814 described above, and utilize a map reduce process to aggregate this metering data at a certain level of granularity (e.g., five minute intervals, fifteen minute intervals, etc.). Further, the network metering service may be configured to categorize the metering data based at least in part on the network bandwidth flow among the computing resource services provided by the computing resource service provider. For instance, the network metering service may categorize the metering data based at least in part on the flow of data through the network (e.g., from the customer 804 to the computing resource service, from the computing resource service to the customer 804, from a computing resource service to another service, etc.).

The network metering service 820 may be configured to utilize this aggregated metering data to determine a P2A score and a correlation coefficient for each customer 804 data flow through the computing resource service provider network to/from the one or more services. For instance, the network metering service 820 may examine the network bandwidth usage for the customer 804 to determine the $99^{th}$ percentile peak usage for the customer 804. The network metering service 820 may then determine, based at least in part on the total network bandwidth usage, an average peak usage for the computing resource service provider network over the same time period. The P2A may then be calculated by obtaining the ratio of this $99^{th}$ percentile peak usage for each customer 804 to the average peak usage for the computing resource service provider network. The network metering service 820 may next calculate a correlation coefficient for the relationship between the network bandwidth usage of the customer 804 and the total network usage by all customers for the particular service. A positive correlation coefficient may denote that the customer's network usage is in greater sync to the total network usage. Alternatively, a negative correlation coefficient may denote that the entity's network usage is asynchronous with the network usage trends for the entire network. A correlation coefficient that is close to zero may denote that the entity's network usage is random and thus there is no correlation.

Based at least in part on the computed P2A score and correlation coefficient, the network metering service 820 may calculate a unit cost burden (e.g., such as through use of Equation 2) for each customer 804. If the unit cost burden for the customer 804 is greater than zero, then the customer 804 may be having a negative impact on the network bandwidth utilization for the computing resource service provider 802. Thus, an administrator may determine, for each customer 804 that bears a positive unit cost burden, a cost attribution that may impose a cost burden on these customers based at least in part on their usage of the computing resource service provider 802 network. Alternatively, if the unit cost burden for the customer 804 is less than zero, the administrator may provide the customer 804 with a discounted price schema for his/her use of the computing resource service provider network.

Figure 9:
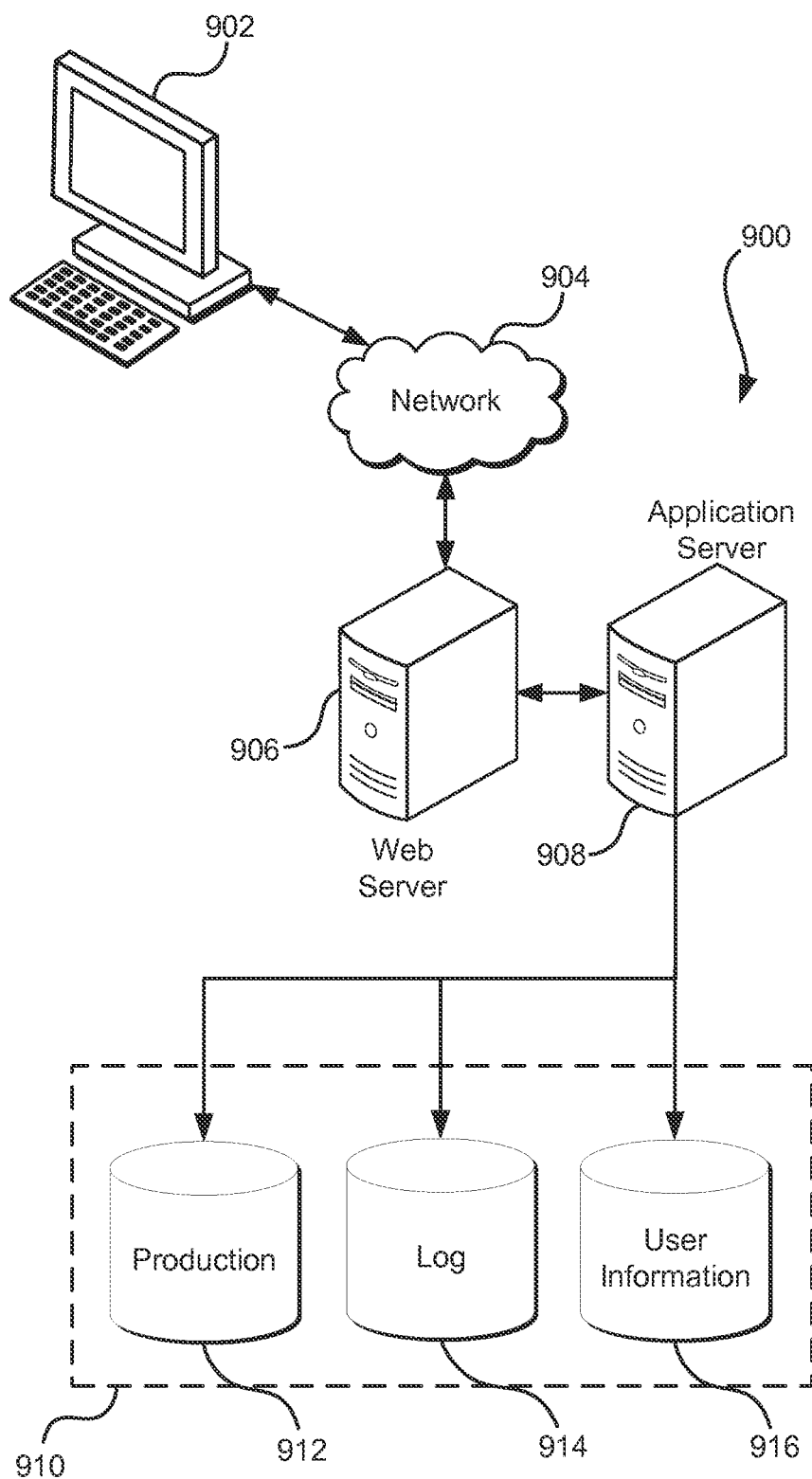
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising at least one computing device that implements one or more services at least in part by one or more processors, wherein the one or more services:
   obtain data associated with bandwidth usage of a plurality of users of a computer resource service provider network that is associated with the one or more services; and
   determine user bandwidth utilization data for the plurality of users by at least, for each user of a set of users of the plurality of users:
      determining a cost burden associated with the user's bandwidth usage, the cost burden determined based at least in part on:
         a first value indicating a ratio between a peak bandwidth usage by the user and average bandwidth usage of the one or more services during a time period at which the peak bandwidth usage is identified; and
         a second value indicating a correlation coefficient between the peak bandwidth usage of the user and the bandwidth usage of the plurality of the users of the computer resource service provider network, wherein the peak bandwidth usage of the user is determined based at least in part on measured bandwidth usage by the user interacting with the network resource service provider network; and
      reducing an amount of bandwidth network resources available to be used by a subset of users of the set of users of the plurality of users at least within an identified time period corresponding to a time of the peak bandwidth usage of the computer resource service provider network, thereby improving efficiency of the computer resource service provider network.

2. The system of claim 1, wherein the first value includes a peak-to-average score for a respective user, the peak-to-average score usable to determine the cost burden.

3. The system of claim 1, wherein the amount of bandwidth network resources available is reduced as a result of a determination that a respective cost burden for the user's bandwidth usage exceeds a threshold value.

4. The system of claim 3, wherein the one or more services update an accounting system that, as a result of being used, causes the accounting system to adjust a rate for a respective user's bandwidth usage.

5. The system of claim 1, wherein the cost burden is constrained such that a sum of respective unit cost burdens for the plurality of users is equal to zero.

6. The system of claim 1, wherein the data is obtained based at least in part on an aggregation of metering data, the metering data specifying network bandwidth usage data for user interactions with the one or more services.

7. The system of claim 1, wherein the user bandwidth utilization data is further determined by at least determining a ratio between a peak bandwidth usage of a respective user of the set of users and a total network bandwidth usage throughout the computer resource service provider network.

8. The system of claim 1, wherein second value indicates whether a respective user's bandwidth usage is asynchronous with a collective bandwidth usage.

9. A non-transitory computer-readable storage medium comprising executable instructions that, as a result of being executed by one or more processors of a computer system, cause the computer system to at least:
   determine user bandwidth utilization data for a plurality of users by, for each user of a first set of users in the plurality of users:
      determining a cost burden associated with a user's bandwidth usage, the cost burden based at least in part on:
         a value indicative of a ratio between peak bandwidth usage by the user and an average bandwidth usage of a computing resource service provider network during a first time period; and
         a coefficient value indicative of a probability that the peak bandwidth usage by the user matches the average bandwidth usage, wherein the peak bandwidth usage by the user is determined based at least in part on metered bandwidth usage by the user interacting with the computing resource service provider network;
   identifying a second set of users based at least in part on the cost burden exceeding a threshold value; and
   reducing an amount of bandwidth network resources available to be used by at least a portion of the second set of users within an identified time period corresponding to a time of peak bandwidth usage for the computing resource service provider network, thereby improving efficiency of the computing resource service provider network.

10. The non-transitory computer-readable storage medium of claim 9, wherein the cost burden is constrained such that a sum of respective unit cost burdens for the first set of users of the plurality of users is equal to zero.

11. The non-transitory computer-readable storage medium of claim 9, wherein the value indicative of the ratio between peak bandwidth usage by a user and average bandwidth usage of the computing resource service provider network during the first time period further indicates a peak-to-average score usable to determine the cost burden.

12. The non-transitory computer-readable storage medium of claim 9, wherein the threshold value is zero.

13. The non-transitory computer-readable storage medium of claim 9, wherein reducing the amount of bandwidth network resources available to be used by at least the portion of the second set of users within the identified time period corresponding to the time of peak bandwidth usage for the computing resource service provider network includes throttling bandwidth usage of the identified second set of users.

14. The non-transitory computer-readable storage medium of claim 9, wherein the executable instructions that, as a result of being executed by one or more processors of the computer system, further cause the computer system to adjust rate for the bandwidth usage of the identified second set of users.

15. The non-transitory computer-readable storage medium of claim 9, wherein a bandwidth usage of a respective user is determined based at least in part on an aggregation of metering data, the metering data specifying network bandwidth usage data for respective user interactions with one or more services and including bandwidth usage of each service for the respective user.

16. The non-transitory computer-readable storage medium of claim 9, wherein the average bandwidth usage of the computing resource service provider network is obtained from an object-based data storage service.

17. A computer-implemented method, comprising:
   obtaining data associated with bandwidth usage of a plurality of users of a computer resource service provider network; and
   determining user bandwidth utilization data for the plurality of users by, for each user of a set of users in the plurality of users:
      determining a cost burden associated with the user's bandwidth usage, the cost burden determined based at least in part on:
         a first value indicating a ratio between a peak bandwidth usage by the user and an average bandwidth usage of the computer resource service provider network during a time period at which the peak bandwidth usage is identified; and
         a second value indicating a correlation coefficient between the peak bandwidth usage of the user and the bandwidth usage of the plurality of the users of the computer resource service provider network, wherein the peak bandwidth usage of the user is determined based at least in part on measured bandwidth usage by the user of the computer resource service provider network; and
   reducing an amount of bandwidth network resources available to be used by a user of the set of users at least within an identified time period corresponding to a time of peak bandwidth usage of the computer resource service provider network, thereby improving efficiency of the computer resource service provider network.

18. The computer-implemented method of claim 17, wherein reducing the amount of bandwidth network resources available to be used by the user of the set of users within an identified time period corresponding to a time of the peak bandwidth usage of the computer resource service provider network includes throttling the bandwidth usage of the user of the set of users.

19. The computer-implemented method of claim 17, further comprising:
   for at least the user of the set of users of the plurality of users, determining that a respective cost burden for the user's bandwidth usage exceeds a threshold value.

20. The computer-implemented method of claim 19, wherein the amount of bandwidth network resources available to be used by at least within the identified time period corresponding to the time of peak bandwidth usage of the computer resource service provider network is reduced as a result of a determination that the respective cost burden for the user's bandwidth usage exceeds the threshold value.

21. The computer-implemented method of claim 20, wherein the threshold value is zero.

\* \* \* \* \*